United States Patent [19]
Eddy et al.

[11] 3,830,983
[45] Aug. 20, 1974

[54] COMMUNICATION SYSTEM INTERLOCK ARRANGEMENT

[75] Inventors: John W. Eddy, Villa Park; Sergio E. Puccini, Wood Dale, both of Ill.

[73] Assignee: GTE Automatic Electric Laboratories Incorporated, Northlake, Ill.

[22] Filed: Dec. 4, 1972

[21] Appl. No.: 311,606

[52] U.S. Cl. .............................. 179/18 ES, 179/18 J
[51] Int. Cl. .............................. H04q 3/54
[58] Field of Search .......... 179/18 ES, 18 E, 18 GE, 179/18 J

[56] References Cited

UNITED STATES PATENTS

| | | | |
|---|---|---|---|
| 3,564,149 | 2/1971 | Funk et al. | 179/18 ES |
| 3,624,305 | 11/1971 | Verbaas | 179/18 E |

*Primary Examiner*—Thomas W. Brown

[57] ABSTRACT

Control transfer arrangement for a communication system including a switching system wherein a marker applies temporary hold signals to establish temporary connections between line circuits and register junctors while also transmitting information signals to a data processor. Logic circuits are provided for responding to instruction signals from the data processor and to signals from the register junctors to develop sustaining hold signals which are applied to sustain connections through the switching system and to permit release of the marker after each connection is established. Important features relate to the form of the logic circuits, to the use of memory means and multiplex circuitry to permit use of common logic circuits and to the provision of timer means for operating trouble indicating means when both conditions required for a sustaining hold signal are not established within a certain length of time after one is established.

15 Claims, 13 Drawing Figures

PATENTED AUG 20 1974

3,830,983

SHEET 01 OF 12

RS MEMORY LAYOUT

COMMUNICATION SYSTEM INTERLOCK ARRANGEMENT

CROSS-REFERENCES TO RELATED APPLICATIONS

The invention claimed herein is disclosed in U.S. patent application Ser. No. 201,851 filed Nov. 24, 1971, now U.S. Pat. No. 3,737,873 by S. E. Puccini for a DATA PROCESSOR WITH CYCLIC SEQUENTIAL ACCESS TO MULTIPLEXED LOGIC AND MEMORY. However, applicants of the present application are the inventors of the matter claimed herein, which matter was disclosed to the applicant of the above-identified patent application during the design of the subsystem.

A U.S. application Ser. No. 281,586, filed Aug. 17, 1972, now U.S. Pat. No. 3,806,659 by J. W. Eddy discloses and claims aspects of the originating control transfer arrangement involving the originating marker.

A terminating control transfer arrangement incorporated in the same system is disclosed and claimed by us in U.S. application Ser. No. 303,157, filed Nov. 2, 1972, now U.S. Pat. No. 3,809,822.

BACKGROUND OF THE INVENTION

1. Field of the Invention

This invention relates to a communication system control transfer arrangement and more particularly to an arrangement for a communication system including a switching network and data processing means, wherein control is transferred in a manner such as to insure the setting up of connections through the switching network under control of signals from the data processing means, with a high degree of reliability. The arrangement is particularly advantageous in telephone systems, although having other applications.

2. Description of the Prior Art

Systems have heretofore been provided including switching networks in which connections are set up between first and second groups of terminals to which, for example, line circuits and register junctors of a telephone system are connected. In such systems, markers have been provided for controlling the setting up of such connections and also for transmitting information signals to data processing means and such markers have included circuitry for permitting release thereof after each connection is established so as to permit the marker to establish other connections. It can happen, however, that the marker may release before a connection is properly established or that a connection may be established through which signals cannot or should not be properly transmitted, for one reason or another.

SUMMARY OF THE INVENTION

This invention was evolved with the general object of overcoming the disadvantages of prior systems and of providing a system having an arrangement for insuring the proper setting up of connections through a switching network with a high degree of reliability.

In brief, the arrangement of this invention includes logic circuitry which responds to signals from junctor means such as register junctors of a telephone system, each such signal providing an indication that temporary hold signals have been applied from a marker to a switching network to set up a temporary connection to the junctor from terminals of the network, such as line terminals in a telephone system. The logic circuitry also responds to instruction signals from a data processor to which information signals are transmitted from the marker. When both a signal from a particular junctor and a corresponding instruction signal are applied to the logic circuitry, the logic circuitry develops a sustaining hold signal which is applied to sustain the connection to the junctor through the switching network and to permit release of the marker so that the marker can control the setting up of another connection through the switching network. With this arrangement, a sustained connection will not be established when no appropriate instruction signal is applied from the data processor and even when an appropriate instruction signal is applied from the data processor, the arrangement will not attempt to provide a sustained connection unless the temporary connection remains established.

According to a specific feature, the signal applied from the junctor to the logic circuitry is such that it not only signifies that temporary hold signals have been applied to the switching network for that particular junctor, but also signifies that a proper connection such as a metallic path has been established, through which signals can subsequently be reliably transmitted. For example, the junctor may be a register junctor in a telephone system, including a relay or other bistable means for responding to dial pulses and it is important that a proper connection be established for transmission of such dial pulses.

Another important feature relates to the use of the logic circuitry in a system including multiplex circuitry such that the logic circuitry can operate as common logic circuitry for a large number of junctors.

A further feature of the invention relates to the combination of the logic circuitry with memory means used to store signals from the junctors and instruction signals from the data processor.

Still another feature of the invention relates to the provision of timer means the operation of which is initiated when either one of two conditions required for the sustaining hold signal is satisfied with an output signal being developed if both conditions remain unsatisfied after a certain time interval, to operate trouble indicating means. Preferably, the timer means may include portions of the memory means, operable in conjunction with the multiplex means.

This invention contemplates other objects, features and advantages which will become more fully apparent from the following detailed description taken in conjunction with the accompanying drawings.

DESCRIPTION OF THE PREFERRED EMBODIMENT

A. General Description of System

Figure 1:
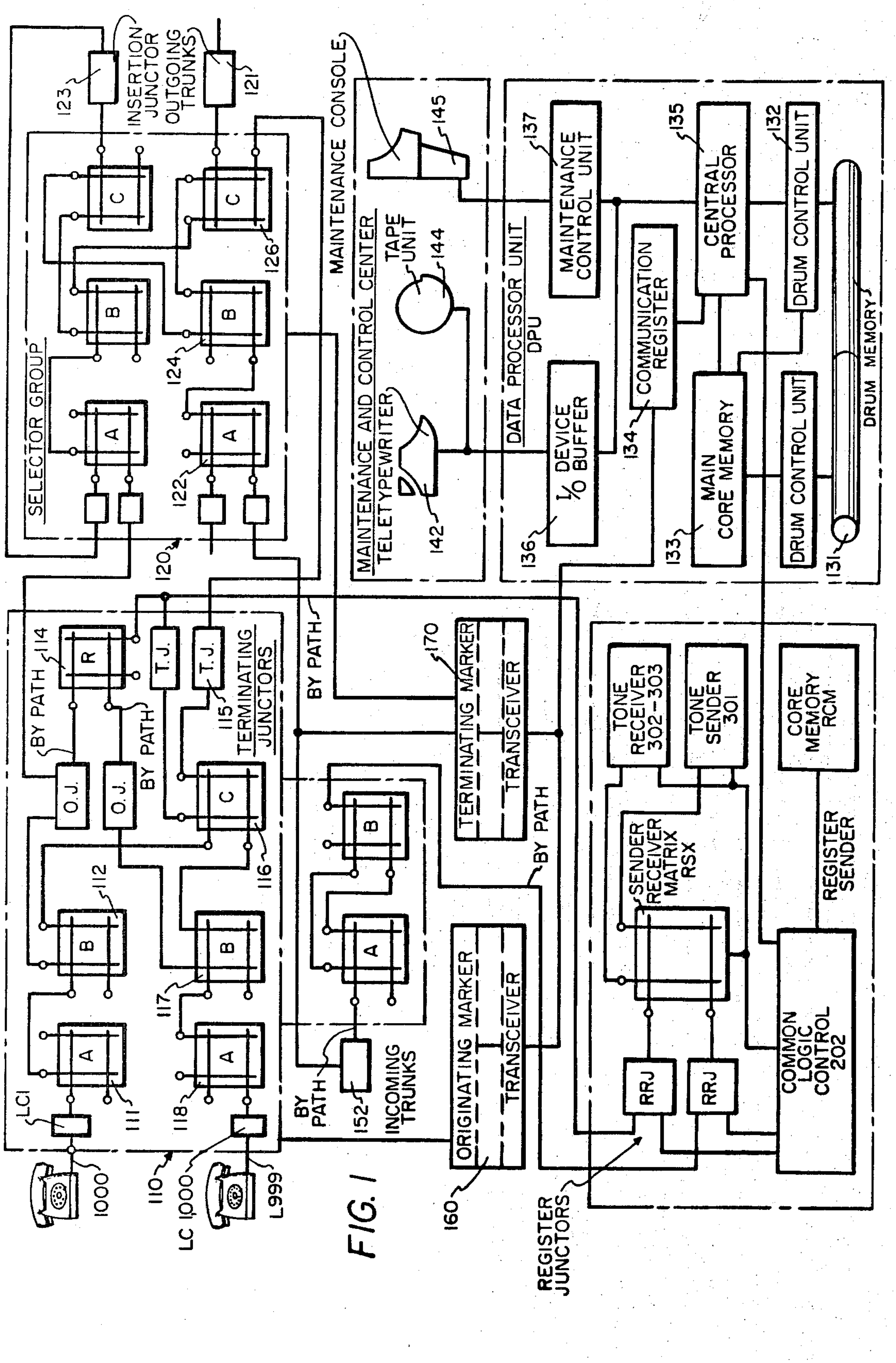
FIG. 1 is a block diagram of a communication switching system incorporating the preferred embodiment of the invention.

FIG. 1 shows a telephone switching system for which the control transfer arrangement of this invention is particularly designed and in which it is especially advantageous. The system is described hereinafter in more detail and is also described in said system patent application and also in said REGISTER-SENDER MEMORY CONTROL patent application. In general, it comprises a switching network including a plurality of line groups such as line group 110, a plurality of selector groups such as selector group 120, a plurality of truck register groups such as group 150, a plurality of originating markers such as marker 160 and a plurality of terminating markers such as marker 170; and a control portion which includes a register-sender group such as RS, a data processing unit DPU and a maintenance control center 140.

Line group 110 includes a large number of line circuits (1000, for example) connected to subscriber's telephones, only two line circuits LC 1 and LC 1000 being shown in FIG. 1. In response to the lifting of a subscriber's hand set, the originating marker 160 operates to find an idle path and to apply temporary hold signals to set up a temporary connection from the corresponding line circuit through A and B matrices of the line group 110 to an originating junctor OJ of the line group 110 and through an R matrix of the line group to one of a substantial number (192 for example) of register junctors RRJ in the register-sender RS. Each of the register junctors RRJ includes signalling means responsive to the establishment of a connection thereto. The originating marker 160, through a transceiver portion thereof, also transmits information signals, identifying the temporary connection so established, to the data processing unit DPU which thereafter transmits instruction signals to the register-sender RS.

The control transfer means of this invention includes logic circuitry in the common logic control 202 of the register-sender RS which responds to instruction signals from the data processing unit DPU and to a signal from the signalling means of the junctors RRJ to develop a sustaining hold signal which is applied to the register junctors RRJ to sustain the connection thereto. After a sustaining connection is so established to a particular register junctor RRJ, the temporary hold signals from the originating marker 160 are released and the originating marker is then free to establish another connection. Through the sustaining connection to the RRJ, information can be transmitted such as for example, dial tone to the subscriber's telephone and digits dialed at the subscriber's telephone which can be transmitted from the register junctor RRJ to a core memory RCM in the register-sender RS. Thereafter, the system operates to set up connections for voice communication.

B. Brief Description of Control Transfer Operation

Figure 2:
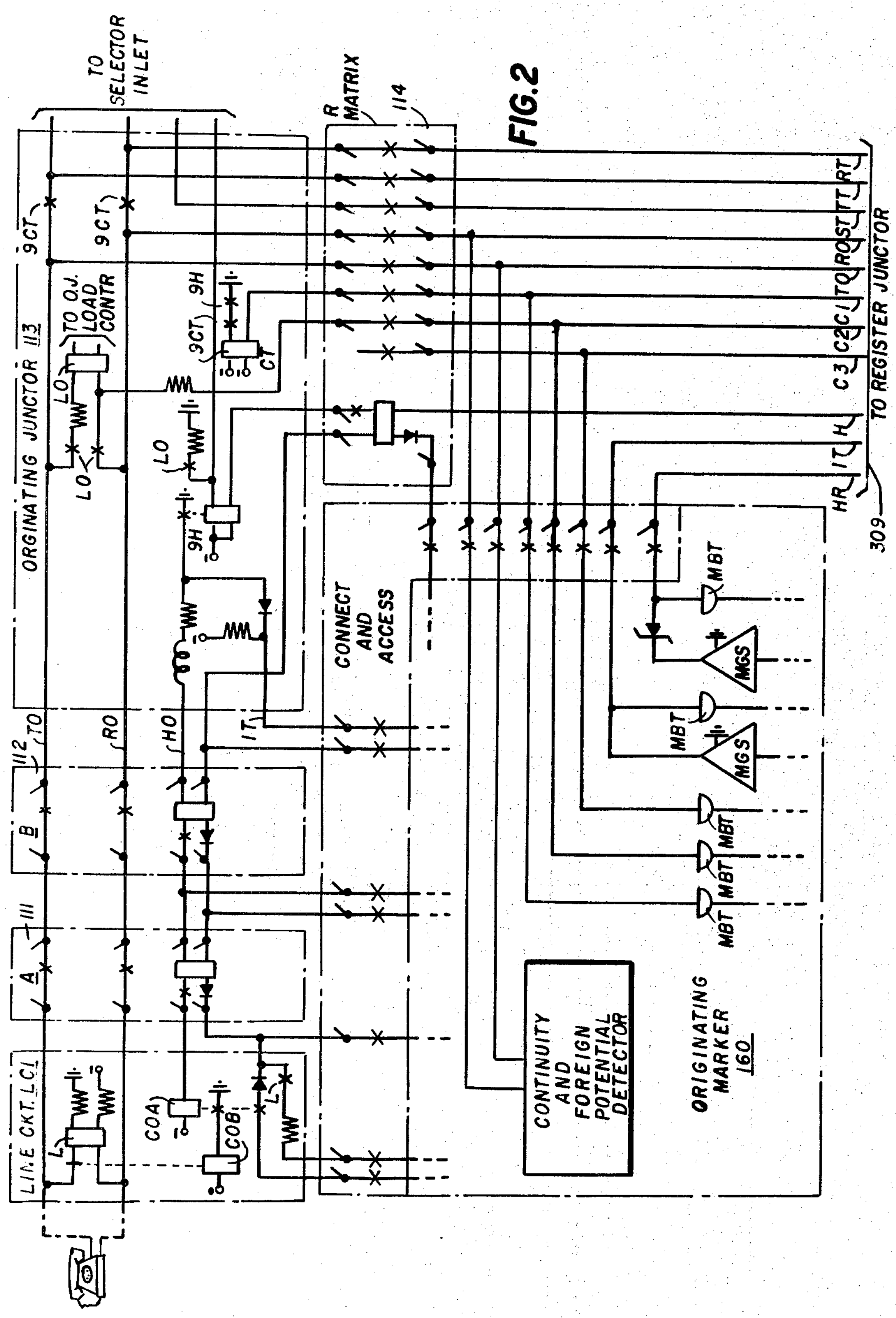
FIG. 2 is a schematic and functional block diagram of a portion of a switching network and originating marker of the system of FIG. 1, for showing an originating connection.
Figure 10:
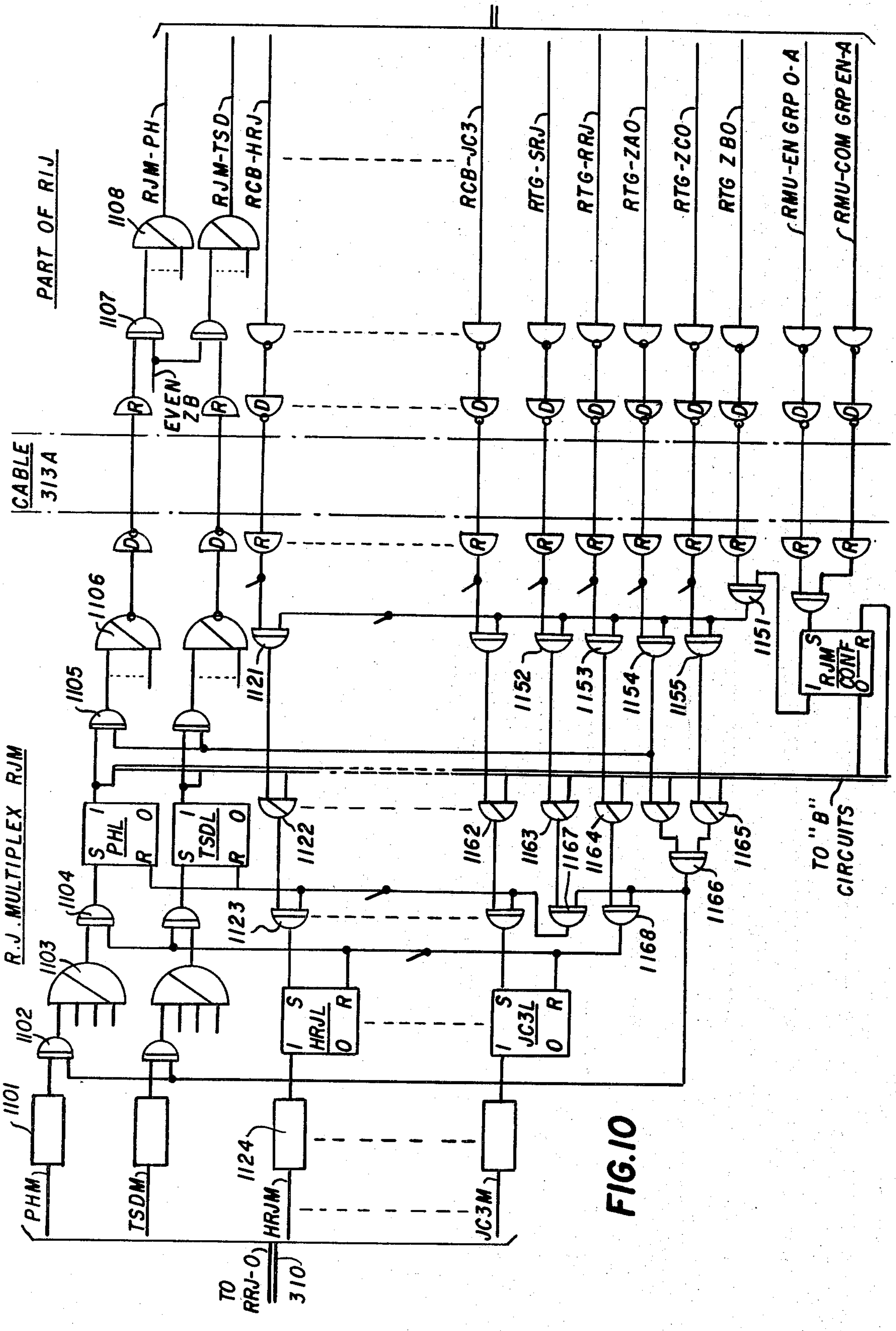
FIG. 10 shows portions of a register junctor multiplex and an interface junctor multiplex circuit pertinent to the invention.
Figure 11:
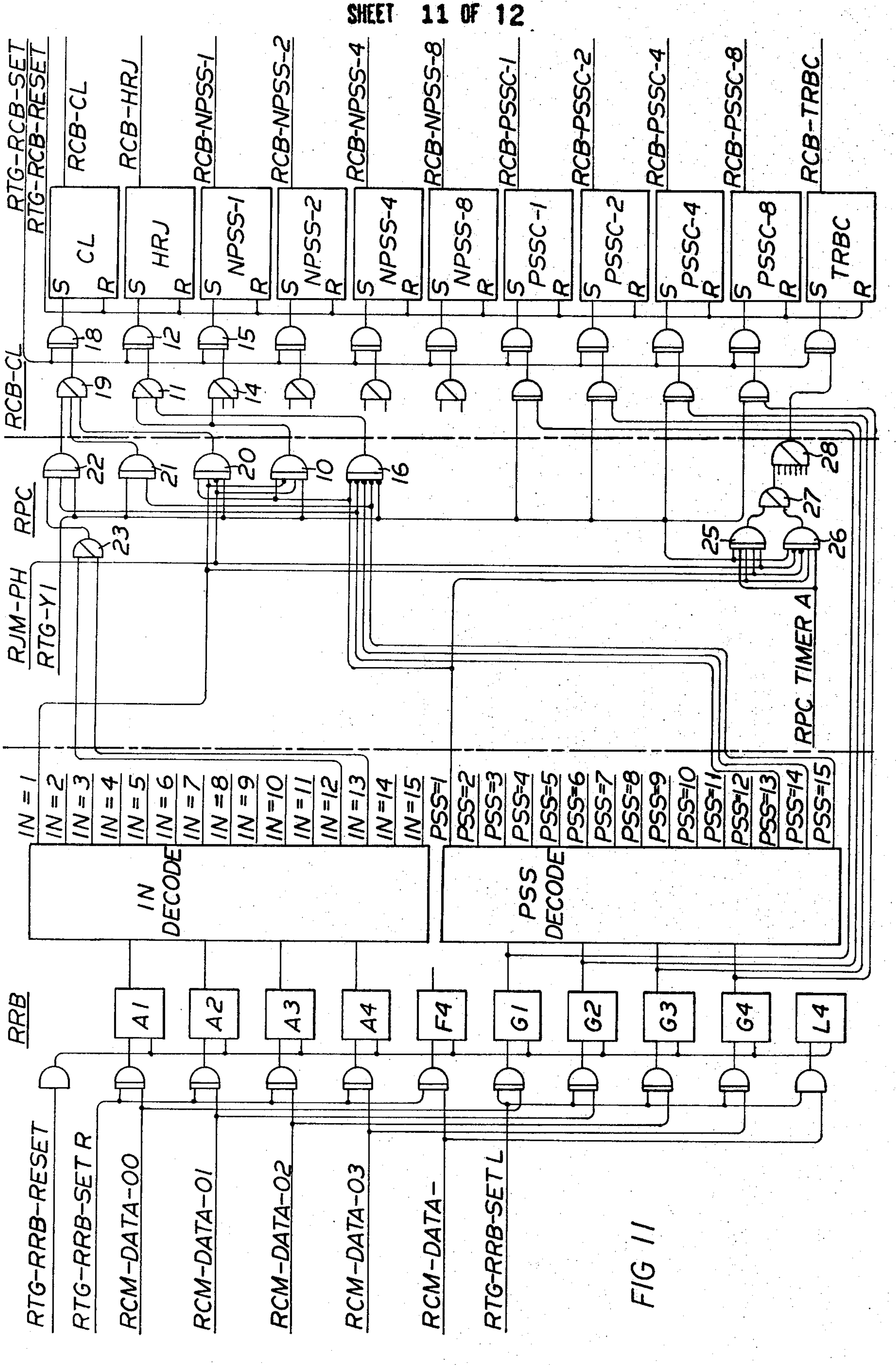
FIG. 11 shows portions of a read buffer, a process controller and a carry buffer pertinent to the invention.

In brief, temporary hold signals are applied from the marker 160 to A, B and R matrices, FIG. 2, to set up a temporary connection from a line circuit such as line circuit LC 1 to a register junctor such as junctor RRJ-O (FIG. 3) to energize an A relay thereof to develop a signal on a line PHM, applied through a multiplex unit RJM and an interface RIJ (FIG. 10) and to one input of a gate 10 in a process controller RPC (FIG. 11). The marker also sends information signals to the data processing unit DPU which applies signals to a memory to be transmitted to a read buffer RRB where they are decoded by an IN decode circuit, one output of which is an IN=0 signal applied to a second input of the gate 10. When both of two necessary conditions are satisfied (PH true and IN=0 not true) and processing conditions are appropriate, the gate 10 develops an output signal which is applied to a latch HRJ in a carry buffer RCB. A signal from latch HRJ is then transmitted back through the interface RIJ and the multiplex unit RJM (FIG. 10) to the register junctor RRJ-0, lead HRJM (FIG. 3), to apply a sustaining hold signal on a line HR, energize a relay 10H of the register junctor and sustain the connection through the A, B and R matrices.

If after establishing only one condition, both conditions are not satisfied within a certain time interval (100 milliseconds), a trouble latch TRBC is triggered from the output of either a gate 25 or a gate 26.

These operations will be clarified from the descriptions of details of the various portions of the system of key interest, which follow.

C. Switching Network, Register Junctor and Marker Operation, FIGS. 2 & 3

FIG. 2 is a schematic and functional block diagram showing one line circuit LC 1, one A stage crosspoint 111, one B stage crosspoint 112, an originating junctor 113 and one R matrix crosspoint 114 of the switching network of line group 110 and also showing portions of the originating marker 160. The originating junctor 113 includes a hold relay 9H, a cut-through relay 9CT and a lockout relay L0.

Figure 3:
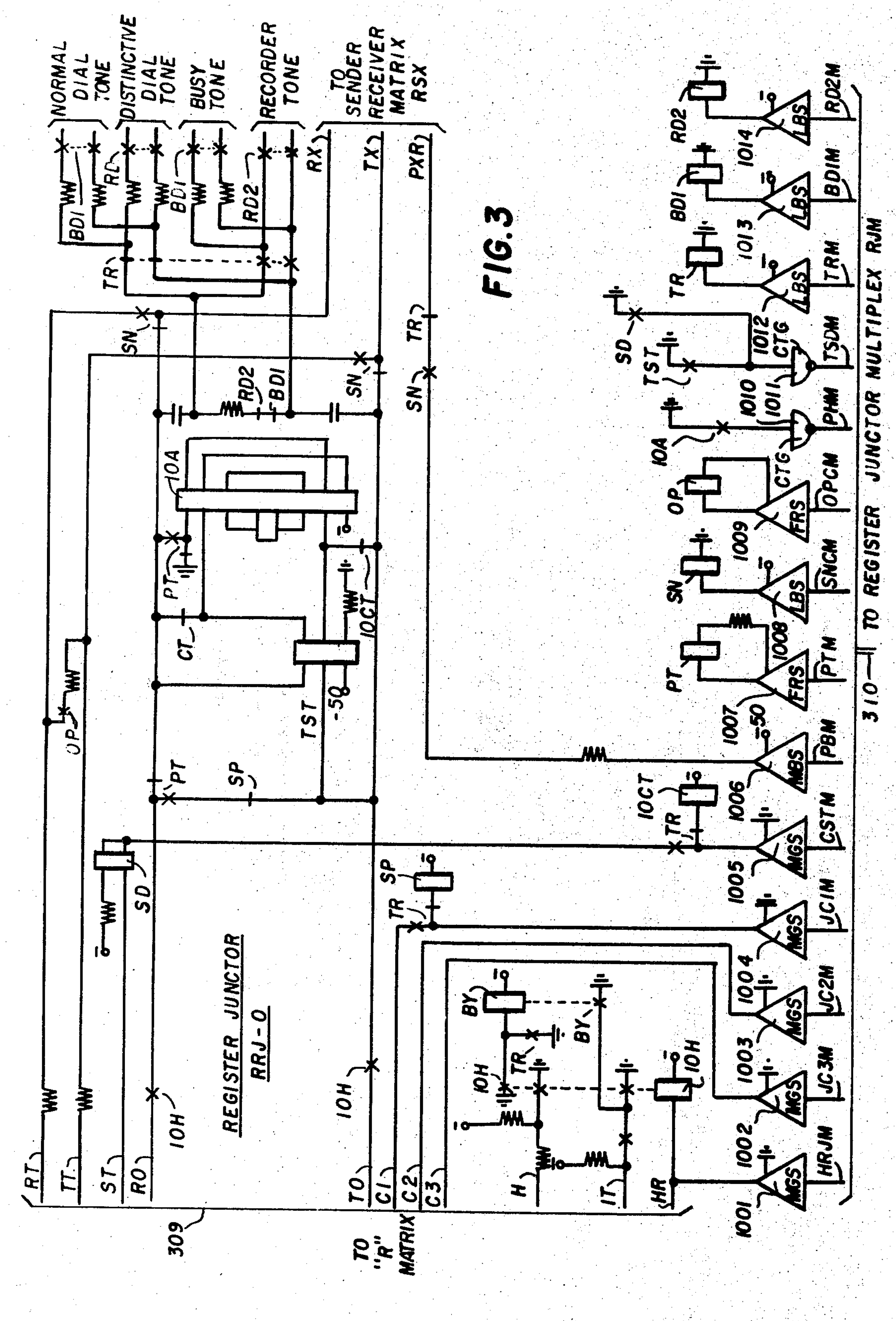
FIG. 3 is a schematic and functional block diagram of a register junctor of the system.

FIG. 3 is a diagram of a register junctor RRJ-0 which is one of a group of local register junctors connected through the R matrix 114 to the originating junctors 113. The register junctor RRJ-0 includes a relay 10H which is a reed relay (correed) energized in the setting up of a connection.

When a subscriber's telephone goes off hook, the condition is detected by the originating marker 160 which then operates to find an idle path through the A, B and R matrices and to connect coils of the relays of certain crosspoints, such as the A, B and R crosspoint stages 111, 112 and 114 illustrated in FIG. 2, to an energizing voltage source. Each of such relays has two windings, one of which is connected in series with a diode, and the initial connection is to the windings connected in series with the diodes. Closing of the relay of the R crosspoint stage establishes a connection from line H through the second coil of the relay of the R crosspoint stage and through a relay 9H of the originating junctor 113 to a negative power supply terminal, thereby establishing a negative potential on line H. This condition is detected by a test circuit of the marker which then connects line H to ground, holding the R stage relay energized and energizing the relay 9H a contact of which is then closed to connect coils of the A and B stage relays and a relay C0A of line circuit LC 1 in series between ground and a negative power supply terminal, thereby holding such relays energized.

The marker then detects the ground condition of line H and then through a main ground switch 162 and a zener diode 163 grounds a line HR which is connected through the coil of the correed 10H of the register junctor RRJ-0 to a negative power supply terminal, thereby energizing the relay 10H.

With relay 10H energized, a contract thereof connects line H to ground through a resistor. Additional contacts of relay 10H connect tip and ring lines T0 and R0 to a pulsing relay A which is then energized and a contact thereof supplies ground to a contact test gate 1010 which generates a true signal on a lead PHM (pulsing highway).

The true signal on lead PHM thus signals operation of all of the relays of the A, B and R matrices which establish a metallic path from the line circuit LC 1 to the register junctor RRJ-0. As hereinafter described, the true signal on lead PHM is transmitted to logic circuitry of this invention. In the meantime, while controlling the setting up of a temporary connection from a line circuit to a register junctor in the manner as thus far described, the originating marker 160 transmits a block of information signals through the transceiver portion thereof to data processing unit DPU. Such information signals identify the particular line circuit and originating and register junctors involved and the data processing unit DPU performs various operations including a translation to determine the actual register junctor identity, there being no direct relationship between the register junctor identity as found by the marker and the actual register junctor identity. The data processing unit DPU may also perform a class of service translation concerning dial tone, party test, coin test, type of ready-to-receive signalling required, type of receiver (if any) required, billing and routing, customer special features, etc.

As a result of processing of such information signals, the data processing unit DPU may send instruction signals back to the register-sender RS. The control transfer means of this invention responds to such instruction signals and to the true signal developed on lead PHM and develops a hold signal which is applied through lead HRJM (FIG. 3) to a main ground switch 1001 to ground line HR and to maintain the relay 10H energized, thus providing a sustaining hold signal to sustain the connections made as above-described.

The originating marker 160, through a MBT (main battery test) gate 164 detects the grounding of line HR and the originating marker 160 then releases the temporary hold signals applied as above-described, and is then free to perform similar operations in response to other subscribers going off hook.

D. Register-sender Subsystem, FIG. 4

Figure 4:
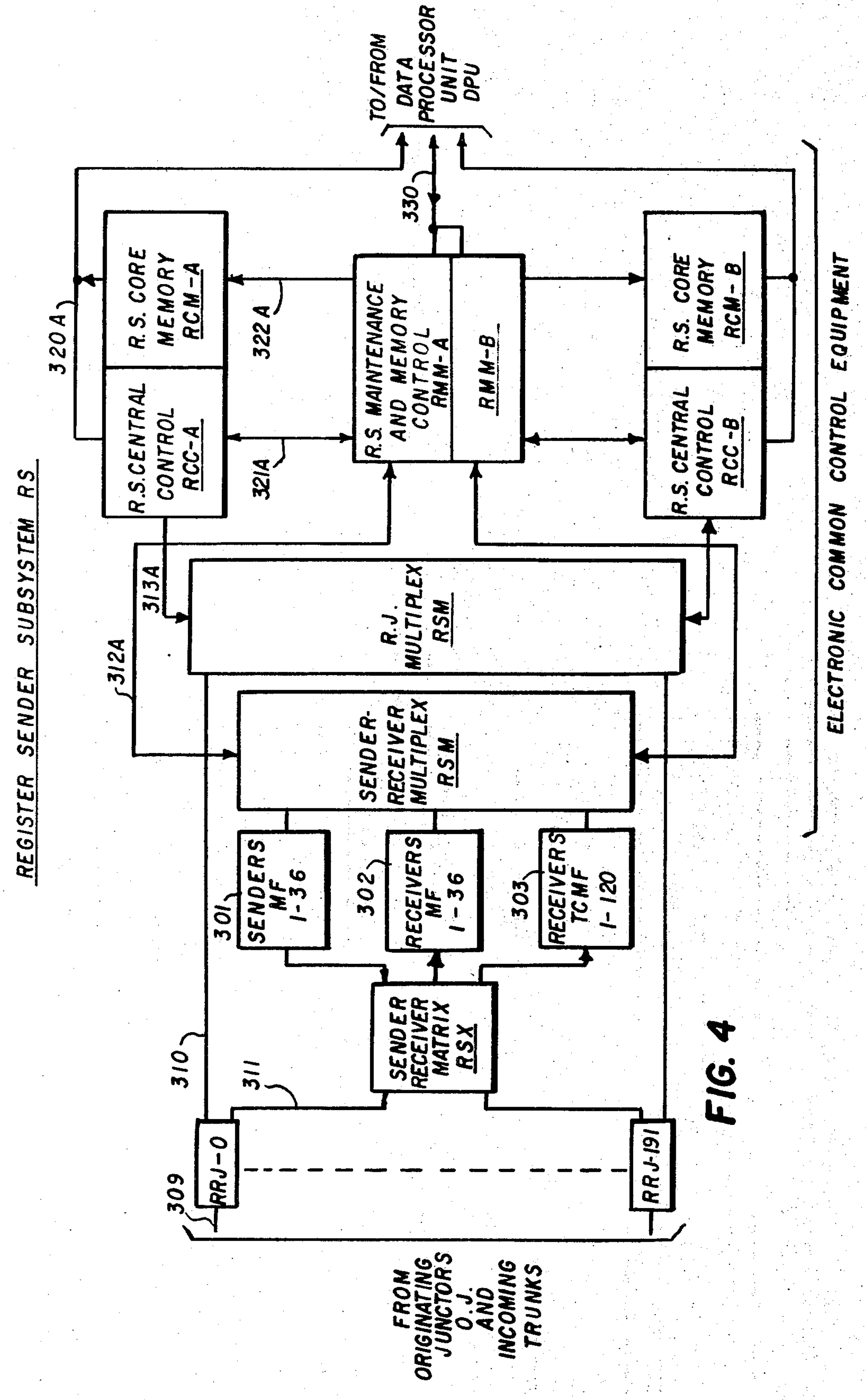
FIG. 4 is a block diagram of a register-sender subsystem.

FIG. 4 is a schematic block diagram of the register-sender subsystem. In the illustrated arrangement, the register-sender RS is a time shared common control unit with the ability to register and process 192 calls simultaneously from local lines or incoming trunks. The register-sender provides electronic time-shared register apparatus for receiving and storing incoming digits and pulse generating sender circuitry to forward a call toward its destination.

In brief, a register junctor multiplex RJM provides communication on a time shared basis between register-sender central control units RRC-A and RCC-B and 192 register junctors RRJ-0 to RRJ-191, the connection from RRJ-0 to the multiplex RJM being indicated by reference numeral 310 and the connection from central control RRC-A to the multiplex RJM being indicated by reference numeral 313A. Thus signal paths are provided between register junctor RRJ-0 and the central control RRC-A for transmission of signals from and to the lines PHM and HRJM referred to above in connection with FIG. 3.

The central control RCC-A communicates with a register-sender core memory RCM-A and also with the data processing unit DPU through connections indicated by reference numeral 320A. A maintenance and memory control RMM-A communicates with the central control RRC-A in the core memory through cables 321A and 322A and with the data processing unit DPU through cable 330.

It is noted that duplicate equipment sets RCC-B, RCM-B and RMM-B are provided which perform the same operations as the equipment sets RCC-A, RCM-A and RMM-A. Under normal conditions, both sets are partially active, one set serving one-half of the register junctors and the other set serving the remaining half of the register junctors. In case of equipment faults, either set of time-shared equipment can serve all of the register junctors.

E. Maintenance and Memory Control, FIG. 5

Figure 5:
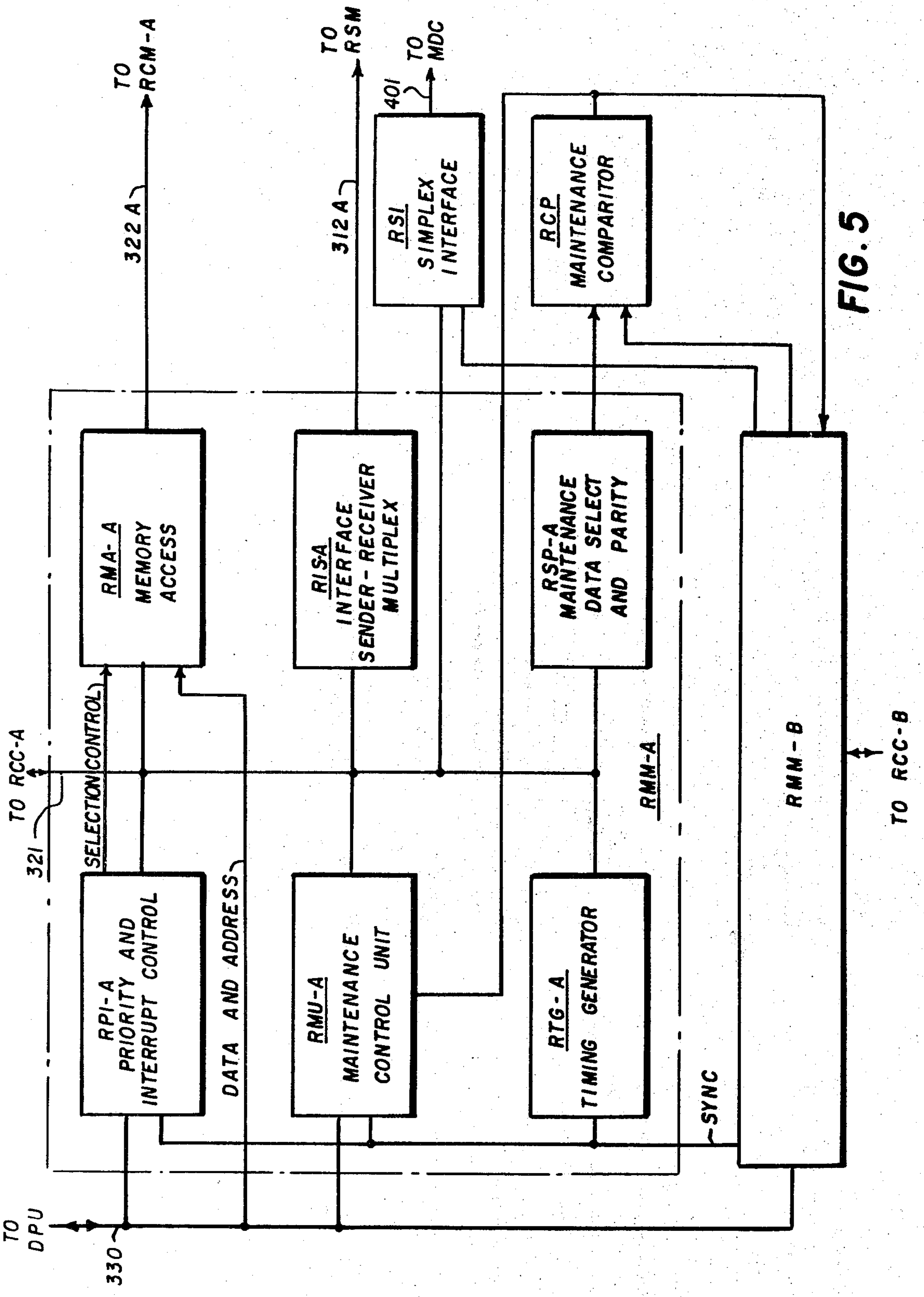
FIGS. 5 and 6 are more detailed block diagrams of portions of the register-sender subsystem.

FIG. 5 is a block diagram of the maintenance and memory control equipment RMM-A. This equipment includes, among other things, a timing generator RTG-A which supplies timing pulses for the multiplex operation of the register-sender subsystem and a memory access unit RMA-A for applying signals to the core memory RCM-A.

F. Register-sender Central Control, FIG. 6

Figure 6:
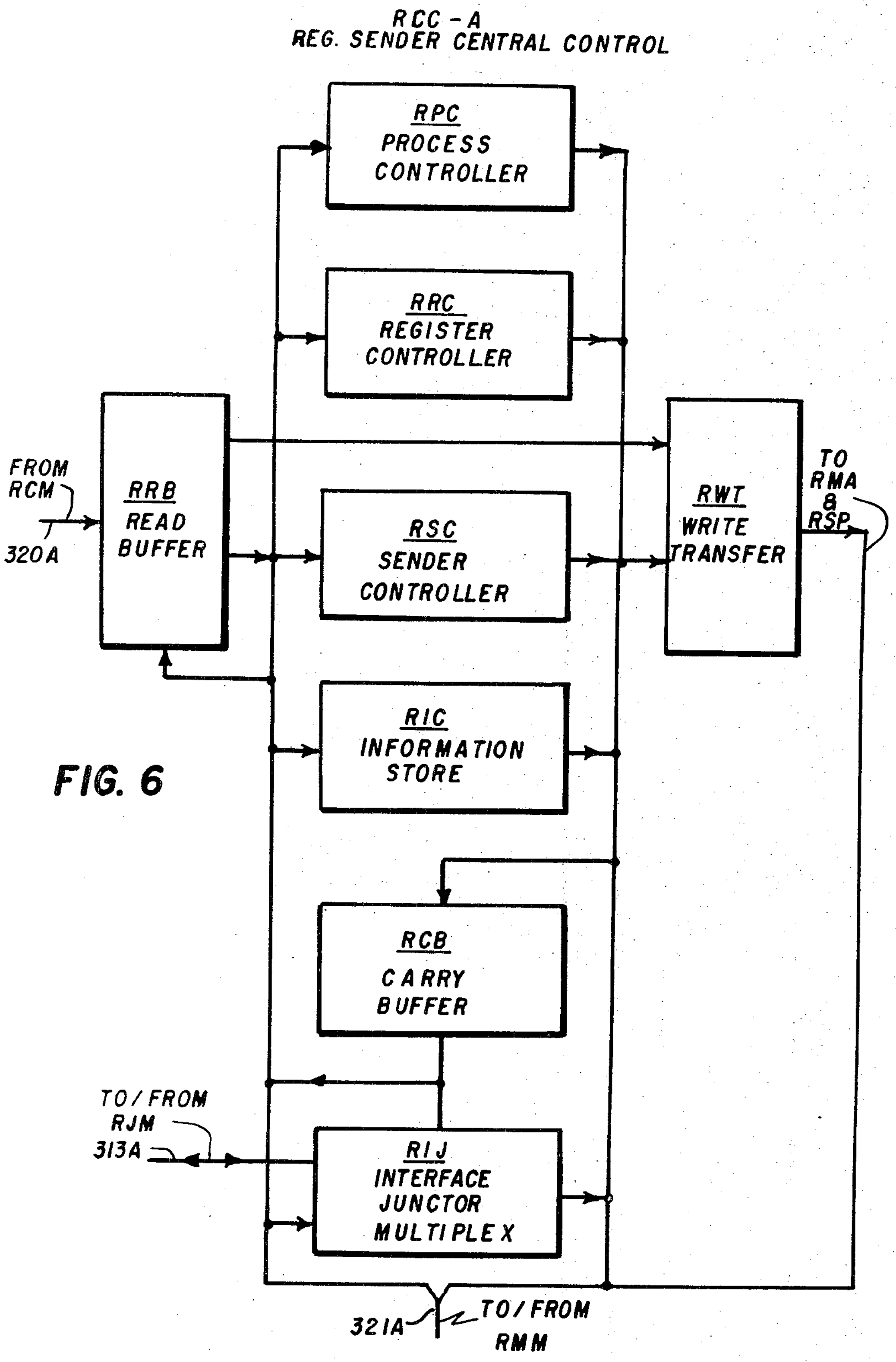

FIG. 6 is a block diagram of the register-sender central control RCC-A. The most important portions, so far as concerns the transfer control of this invention, are a process controller RPC which contains common logic circuitry including the logic circuitry of this invention; a read buffer RRB which supplies signals to the process controller RPC derived from the core memory RCM-A and in turn from the data processor DPU; a carry buffer RCB to which signals are applied from the process conroller RPC and other circuits; an interface junctor multiplex RIJ which operates with the register junctor multiplex RJM of FIG. 4 for multiplexing to and from the register junctors; and a write transfer circuit RWT for applying signals through the memory access RMA to core memory RCM-A.

G. Register Timing Generator, FIG. 7.

Figure 7:
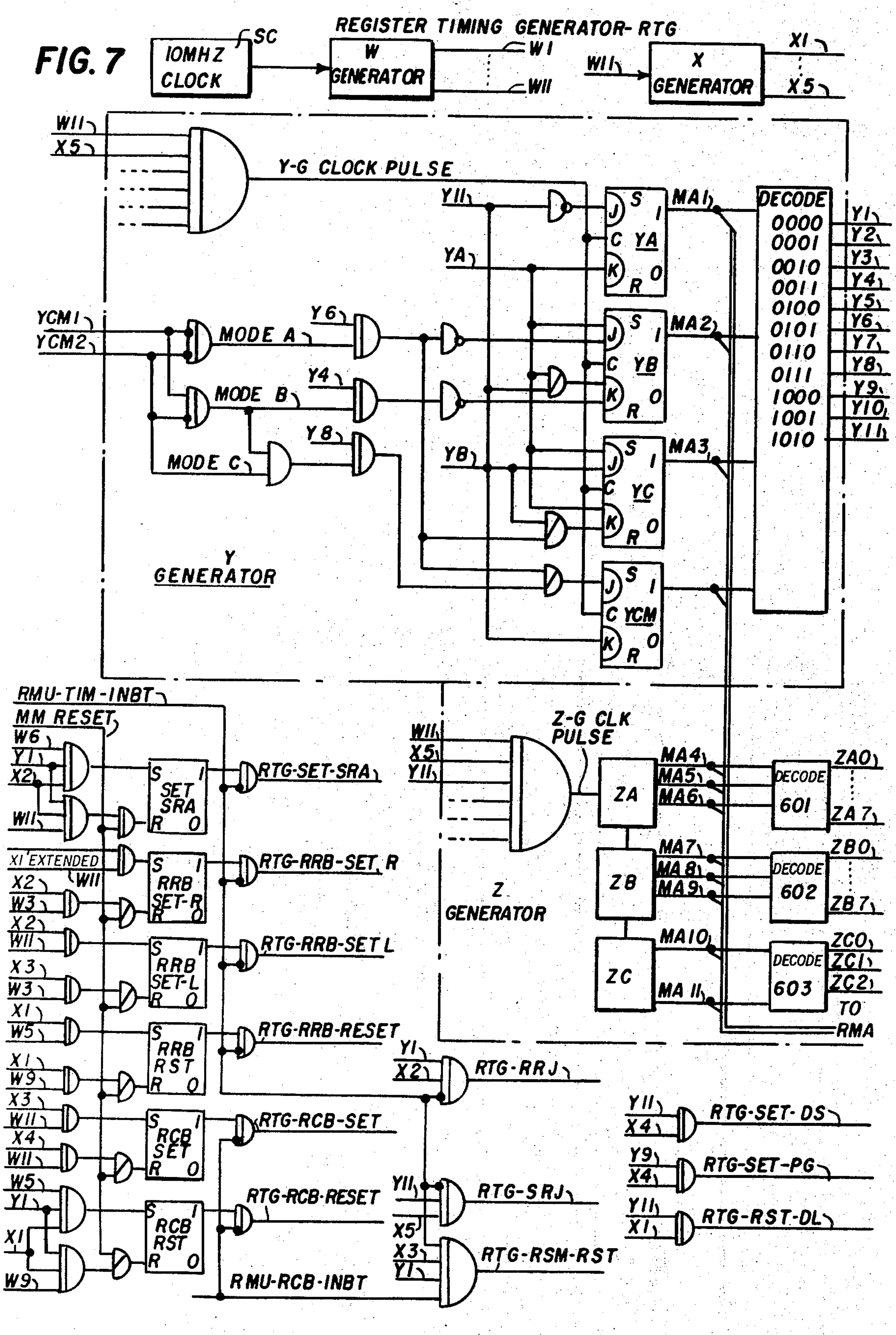
FIG. 7 is a functional block diagram of a register timing generator.

FIG. 7 is a functional block diagram of the register timing generator RTG, described in more detail hereinafter. In general, it comprises W, X, Y and Z generators controlled from a 10 MHZ clock SC.

The W generator generates eleven sequential output pulses on lines W1 through W11 each having a duration of 100 nanoseconds, with a cycle time of 1.1 microseconds.

The X generator generates five sequential output pulses on lines X1 through X5 each having a duration of 1.1 microseconds, with a cycle time of 5.5 microseconds.

The Y generator is operative in various modes. In an A mode, nine sequential output pulses are developed on lines Y1 through Y6 and Y9 through Y11, each having a duration of 5.5 microseconds, with a cycle time of 49.5 microseconds. In a B mode, sequential output pulses are developed on lines Y1 through Y4 and Y6 through Y11.

The Z generator generates 202 sequential output pulses each having a duration of 49.5 microseconds with a cycle time of approximately 10 milliseconds.

H. Timing Relationships, FIG. 8

Figure 8:
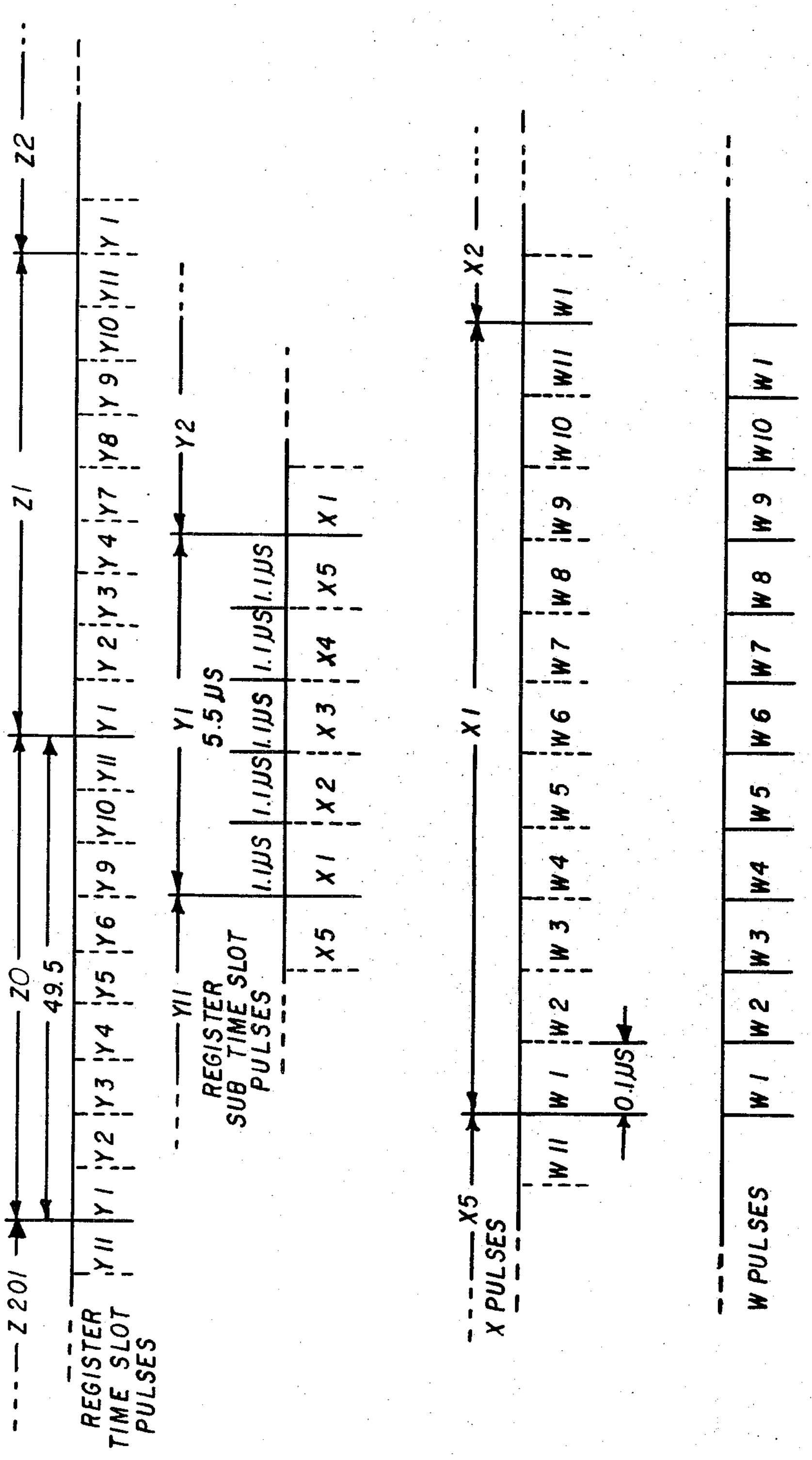
FIG. 8 shows the timing relation of outputs of the register timing generator of FIG. 7.

FIG. 8 shows the timing relationship of the outputs of the timing generator RTG. The outputs of the Z generator define time slots Z0 through Z201, time slots Z0 through Z191 being respectively assigned to the 192 register junctors and the remaining ten being reserved for maintenance purposes. Each Z time slot has a duration of 49.5 microseconds and is divided into nine Y sub-time slots of 5.5 microseconds each, mode A being shown for the time slot Z0 and mode B being shown for the time slot Z2. Each Y sub-time slot is divided into 55 pulses of 0.1 microseconds each, comprising five X pulses of 1.1 microseconds each sub-divided into eleven W pulses of 0.1 microseconds each. The 55 combinations of X and W timing pulses can be utilized for accessing the memory and different logic circuits during various different times of a single sub-time slot.

I. Memory Layout, FIG. 9

Figure 9:
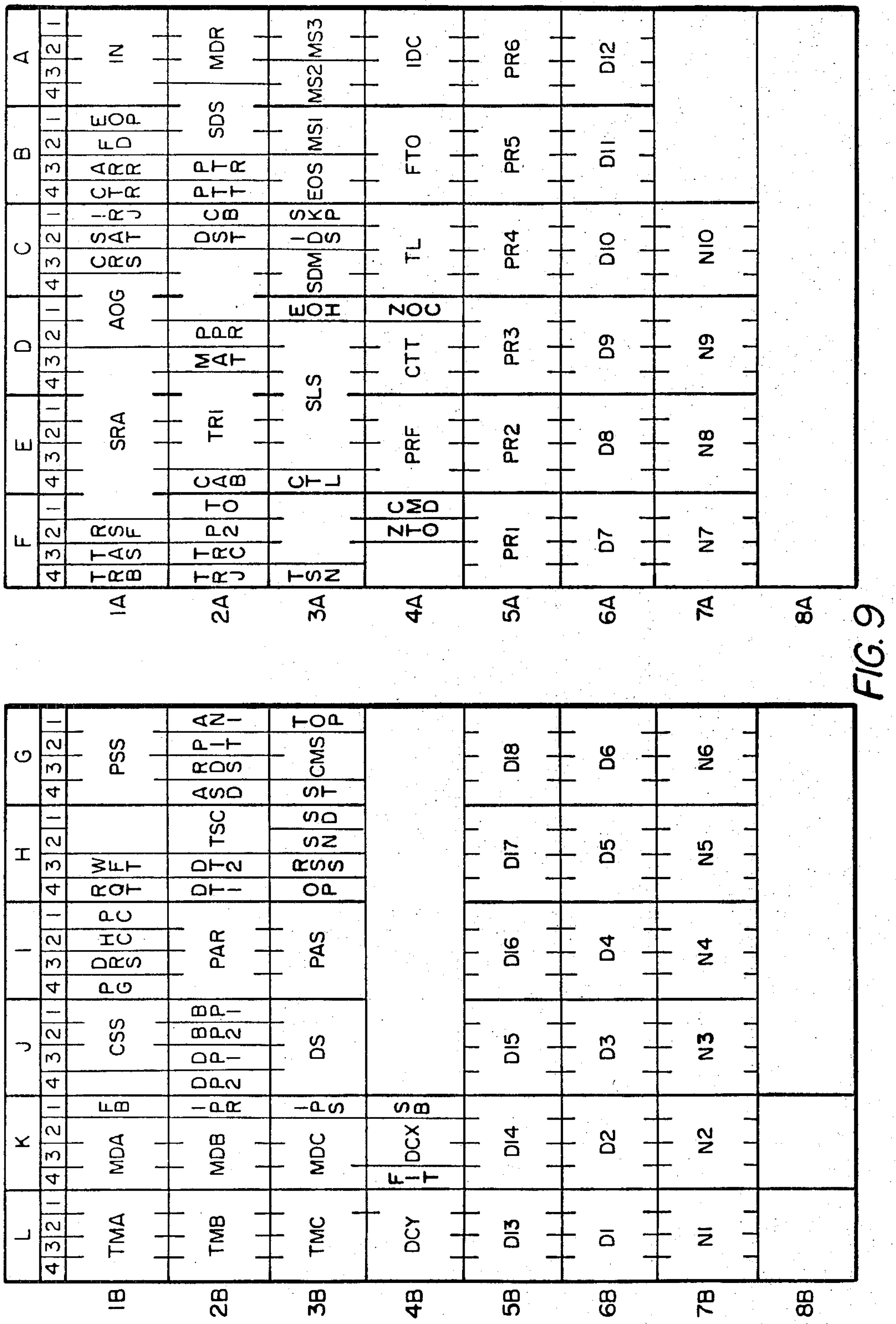
FIG. 9 shows the layout of a memory for one register of the system.

FIG. 9 shows the memory layout of one register. Digits may be stored in a plurality of rows, row 1 (word stores 1A and 1B) being associated with subtime slot Y-1 and also being associated with the process controller RPC in which the logic circuits of the invention are located. Six four bit words A through F may be stored in word store 1A and six additional four bit words G through L may be stored in word store 1B. The A, G, K and L word stores are of particular interest.

An A word in row 1 is used for instructions from the data processor DPU and four bits A1–A4 thereof may be decoded to produce 16 decoded instructions designated as IN=0 through IN=15. Of these 16 instructions, IN=0 and IN—1 are of particular interest. The value IN=0 is a no operation instruction, it is the value present during the idle state and is also used by the data processing unit at various other times during a call. The value IN=1 is the start junctor operation and indicates to the register-sender that the register junctor identity has been determined by the register junctor translation and that the register-sender can begin processing the call for that register junctor. When IN=0 is not true, an instruction signal is produced indicating that when the signal on lead PHM is true at the same time, the sustaining hold signal can be applied to line HRJM.

A G word in row 1 is used for process sequence state (PSS) control. Four bits G1-G4 thereof may be decoded to produce 16 decoded states PSS=0 through PSS=15. State PSS=0 is the idle state of the register junctor. The register junctor translation is normally received from the data processing unit during state PSS=0 and if it is received along with a true signal derived from lead PHM, the register-sender is shifted into state PSS=1. States PSS=1 through PSS=15 are used for various call processing, cut-through control register disconnection and other operations.

The K and L word stores in row 1 are used to provide an A timer in which a TMA field (word store L) is advanced at a rate determined by an MDA field (bits 2–4 of store K). Normally, most of the memory, including the TMA and MDA fields, is reset every cycle, i.e. every 10 milliseconds. However, if only one of the conditions required for applying a sustaining hold signal is satisfied, the timer is not reset and is allowed to advance. If after 10 cycles (100 milliseconds), both conditions have not been satisfied, a trouble signal is developed through logic circuitry as hereinafter described.

J. Pertinent Multiplex and Interface Circuits, FIG. 10

FIG. 10 shows parts of the register junctor multiplex RJM and interface junctor multiplex RIJ pertinent to the invention. As above-described, when the pulsing relay A of the register junctor RRJ-0 (FIG. 3) is operated its contacts supply a signal via the control test ground circuit 1010 to lead PHM. This signal in the multiplex circuit RJM is supplied via an interface circuit 1101 to a gate 1102. At the beginning of a time slot, gate 1102 is enabled by a signal applied to a second input thereof, from a gate 1166, and an output signal from gate 1102 is applied through gates 1103 and 1104 to the set input of a scan latch PHL. The output of scan latch PHL is transmitted through gates including gates 1105 and 1106 in the multiplex unit RJM and gates 1107 and 1108 in the interface unit RIJ and through a line RJM-PH to the process controller RPC.

The logic circuitry of this invention, as hereinafter described, operates under appropriate conditions to apply a signal to a latch in the carry buffer RCB, the output of the carry buffer latch being applied through line RCM-HRJ and through gates including gates 1121–1123 to the set input of a latch HRJL in the register junctor multiplex RJM. The output of latch HRJL is applied through an interface circuit 1124 and through the line HRJM to the register junctor RRJ-0 (FIG. 3) to supply the sustaining hold signal operative as above-described.

It is noted that latch HRJL is reset at the beginning of every time slot from a signal from the output of a gate circuit 1168 having inputs coupled through logic circuitry including gates 1164–1166 and gates 1153–1155 to timing generator lines RTG-RRJ, RTG-ZAO RTG-ZBO and RTG-ZCO, Then, near the end of a time slot, latches including latch PHL are reset by a signal from the output of gate 1167 having an input coupled through gates 1163 and 1152 to timing generator line RTG-SRJ. The multiplexing arrangement is such that the control latches including latch HRJL are set at the end of a time slot for a particular register junctor, remain set during the time slots for the other register junctors and are then reset at the beginning of the next time slot for that particular register junctor. Thus the latch HRJL may remain set substantially continuously, being briefly reset one each cycle for only a short time interval which does not affect the relay 10H in the register junctor.

K. Key Portions of Read Buffer, Process Controller & Carry Buffer, FIG. 11

FIG. 11 shows portions of the read buffer RRB, the process controller RPC and the carry buffer RCB.

The carry buffer RCB includes a plurality of latches each of which has a set input connected to an AND gate, one input of each AND gate and a reset input of each latch being respectively connected to lines RTG-RCB-SET and RTG-RCB-RESET from the timing generator RTG (FIG. 7), the latches being reset at the end of each time slot.

Latch CL in the carry buffer RCB is used to clear the memory when the register is idle or entering the idle state, and also in a maintenance busy state.

Latch HRJ in the carry buffer RCB is controlled by logic circuitry in the process controller RPC, forming an important feature of the invention, and is used to develop the signal applied through the interface unit RIJ and through the gates including the gates 1121–1123 to the set input of latch HRJL in the register junctor multiplex RJM (FIG. 10). As above-described, the output of the latch HRJL is applied through an interface circuit 1124 and through the line HRJM to the register junctor RRJ-0 (FIG. 3) to supply the sustaining hold signal as previously described.

The carry buffer further includes latches PSSC-1, PSSC-2, PSSC-4 and PSSC-8 which are for the process sequence state carry to make the current sequence state available for all sub-time slots of a time slot and latches NPSS-1, NPSS-2, NPSS-4 and NPSS-8 which are for a new processing state to be effective in the next cycle. In addition a trouble latch TRBC is provided which is set under certain processing conditions. As hereinafter described, latch TRBC is set if after one condition required for applying a sustaining hold signal is satisfied and thereafter the other is not satisfied within a certain length of time.

The read buffer RRB comprises forty-eight latch circuit A1 through L4 corresponding to the bits of a row in the memory. During each sub-time slot th information from the corresponding row of memory is read, first the A word in response to a signal RTG-SET-R from the timing generator RTG (FIG. 7) and then the B word in response to a signal RTG-SET-L. Latch circuits are provided for the four digits A1-A4 of an A word in row 1 of the memory and are decoded by an IN-DECODE circuit to produce instruction signals IN=0 through IN=15. Similarly, latch circuits are provided for the four digits of a G word in row 1 of the memory and are decoded by a PSS-DECODE circuit to produce decoded signals PSS=0 through PSS=15.

The process controller RPC includes common logic circuitry responsive to IN and PSS signals from the read buffer RRB, to the RJM-PH signal derived through the register junctor multiplex RJM from a PHM lead of a particular register junctor such as the RRJ-0 junctor of FIG. 3 and to a RTG-Y1 signal from the timing generator RTG (FIG. 7) to control setting of the HRJ latch of the carry buffer RCB.

In particular, a gate 10 is provided having an output connected through an OR gate 11 and an AND gate 12 to the set input of latch HRJ, the other input of AND gate 12 being connected to the RTG-RCB-SET line from the timing generator RTG. Gate 10 has four inputs respectively responsive to a signal PSS=0 from the PSS decode circuit, to a signal IN=0 from the IN-DECODE circuit, to the RJM-PH signal from the register junctor multiplex RJM (FIG. 10) and to a timing signal RTG-Y1 from the timing generator (FIG. 7). Gate 10 produces an output to set the latch HRJ when the PSS=0, RJM-PH and RTG-Y1 signals are true and the IN=0 signal is not true. As above indicated, when the IN=0 signal is not true, it is in effect an instruction signal from the data processor DPU that the register junctor identity has been determined by the register junctor translation and that the register-sender can begin processing the call for that register junctor. Thus when the PH signal is true at the same time, indicating that the register junctor is properly operating, the sustaining hold signal can be applied to the register junctor.

The output of gate 10 is also applied through an OR gate 14 and an AND gate 15 to the set input of the carry buffer latch NPSS-1 which is effective for making a new processing sequence state to be effective in the next cycle as hereinafter described in connection with FIG. 12. During the remainder of call processing, the HRJ latch is set every cycle either from the output of the gate 10 or from the output of a gate 16 connected to a second input of OR gate 11. The output of gate 16 is true every cycle during sub-time slot Y1 except when the sequence state is not the idle state PSS=0 in which gate 10 operates, a register disconnect state PSS=13, a spare state PSS=14 or a register off-line state PSS=15.

As above-described in connection with the memory layout of FIG. 9, an A timer is provided in which a TMA field (word store L) is advanced at a rate determined by an MDA field (bits 2–4 of store K). Normally most of the memory including the TMA and MDA fields is reset every cycle, i.e. every 10 milliseconds, by the clearing latch CL which has a set input connected to the output of an AND gate 18 having one input connected to line RTG-RCB-SET and a second input connected to the output of an OR gate 19. One input of OR gate is connected to the output of an AND gate 20 having inputs responsive to states PSS=0 and IN=0 and to signals RJM-PH and RTG-Y1. In normal operation, when during the states PSS=0 and the timing signal RTG-Y1, IN=0 is not true or PH is true, no output signal is applied from gate 20 and the latch CL is not set so that the TMA and MDA fields are not cleared and the timing action thereof advances.

It is noted, however, the latch CL may be cleared under special conditions. As shown, a second input of gate 19 is connected to the output of an AND gate 21 which develops an output during the Y1 sub-time slot when the register off-line state PSS=15 is true. A third input of gate 19 is connected to the output of an AND gate 22 having first and second inputs responsive to state PSS=13 and the sub-time slot RTG-Y1 signal and having a third input connected to the output of an OR gate 23 having inputs responsive to the IN=12 and IN=13 states. When, during the state PSS=13 and the Y1 sub-time slot, either the condition IN=12 (clear memory) or the condition IN=13 (clear memory and register-sender off-line) is satisfied, the latch CL is set from the output of gate 22 to clear the memory.

Except under such special conditions in which gates 21 and 22 operate, if only one and not both of the conditions required for setting latch HRJ (IN=0 and PH true) has been satisfied the clear latch CL is not set and the A timer advances. If after 10 cycles (100 milliseconds), both conditions have still not been satisfied, a signal RPC-TIMER A=100 ms is developed which is applied to inputs of a pair of AND gates 25 and 26 having outputs connected through an OR gate 27 and an OR gate 28 to one input of an AND gate 29. A second input of AND gate 29 is connected to the RTG-RCB-SET line and the output thereof is connected to the set input of the trouble latch TRBC. The latch TRBC is set from the output of gate 25 when during the Y1 sub-time slot, the PSS=0 state and the TIMER A (100 ms) signal, the signal RJM-PH is true while the signal IN=0 is also true. The latch TRBC is set from the output of gate 26 when during the Y1 sub-time slot, the PSS=0 and the TIMER A Signal, the signal RJM-PH is not true while the signal IN=0 is also not true.

L. Digit Rewrite & Recirculation, FIG. 12

Figure 12:
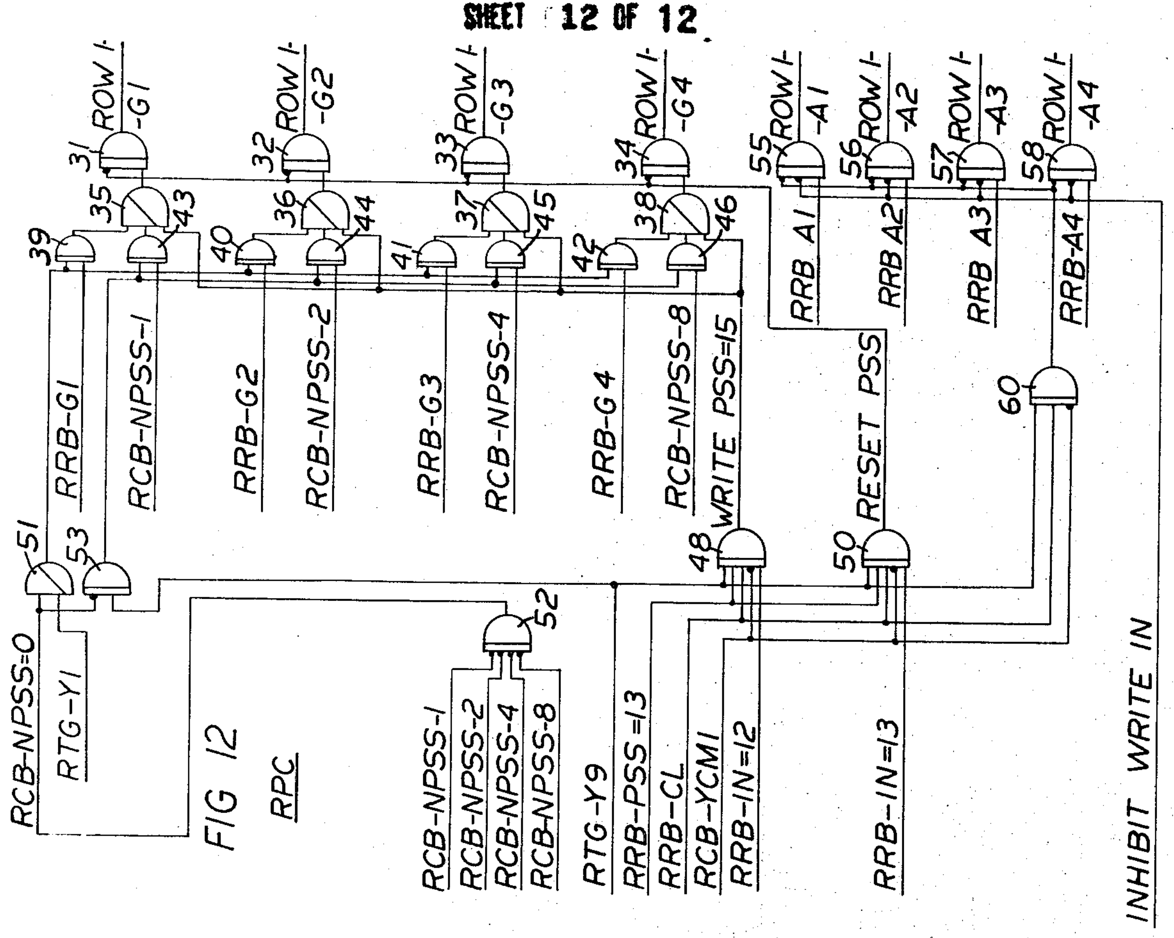
FIG. 12 shows circuitry for controlling rewrite and recirculation of digits in the memory of the system.

FIG. 12 shows circuitry for controlling the rewrite of G position digits in the memory and for the recirculation of A position digits. Gates 31–34 control the rewrite of G position digits and have inputs connected to outputs of four OR gates 35–38 having first inputs connected to the outputs of four AND gates 39–42, second inputs connected to the outputs of four AND gates 43–46 and third inputs connected together and to the output of a gate 48 which develops a WRITE PSS=15 signal during a RTG-Y9 sub-time slot signal when RRB-PSS=13, RRB-CL and RRB-IN=13 signal are true and an RCB-YCM1 signal is not true. Second inputs of gates 31–34 are responsive to a RESET PSS signal from a gate 50, gates 31–34 being inhibited during the Y9 sub-time slot when the RRB-PSS=13, RRB-CL and RRB-IN=13 signals are true while the YCMI signal is not true.

Inputs of the gates 39–42 are connected to the output of an OR gate 51 having one input responsive to an RCB-NPSS=0 signal developed by a gate 52 when NPSS=1, NPSS=2, NPSS=4 and NPSS=8 signals from the carry buffer RCB are not true. A second input of the OR gate 51 is responsive to the RTG-Y1 sub-time slot signal and second inputs of the AND gates 39–42 are responsive to G1 through G4 signals from the read buffer RRB. Inputs of gates 43–46 are connected together and to the output of a gate 53 which is true when the NPSS=0 signal is not true and the Y9 sub-time slot signal is true. Second inputs of gates 43–46 are responsive to NPSS=1, NPSS=2, NPSS=4 and NPSS=8 signals from the carry buffer RCB.

In operation, during each time slot during the first access sub-time slot for row 1, the processing digit is rewritten with AND gates 39–42 and 31–34 being enabled. During the second access for row 1, during sub-time slot Y9, the digit is again normally rewritten from position G of the read buffer RRB if the signal from the carry buffer latches is decoded with the value RCB-NPSS=0 indicating there is no new sequence state to be entered in the cycle. However, if there is a new sequence state, AND gate 53 is enabled and gates 43–46 are enabled to gate the new sequence state digit from the carry buffer latches NPSS for writing into memory.

Instruction digits in position A of row 1 of the memory are normally recirculated via gates 55–58, except under certain processing conditions in response to the true condition of an INHIBIT WRITE-IN signal and except in response to a signal from the output of a gate 60, developed during the Y9 sub-time slot when the RRB-CL signal is true and the RCB-YCM1 signal is not true. Gate 60 also inhibits the rewrite not only of the digit in position A but all the other digits in row 1 except for the sequence state digit in position G.

M. Summary of Operation of Control Transfer Arrangement, FIG. 13

Figure 13:
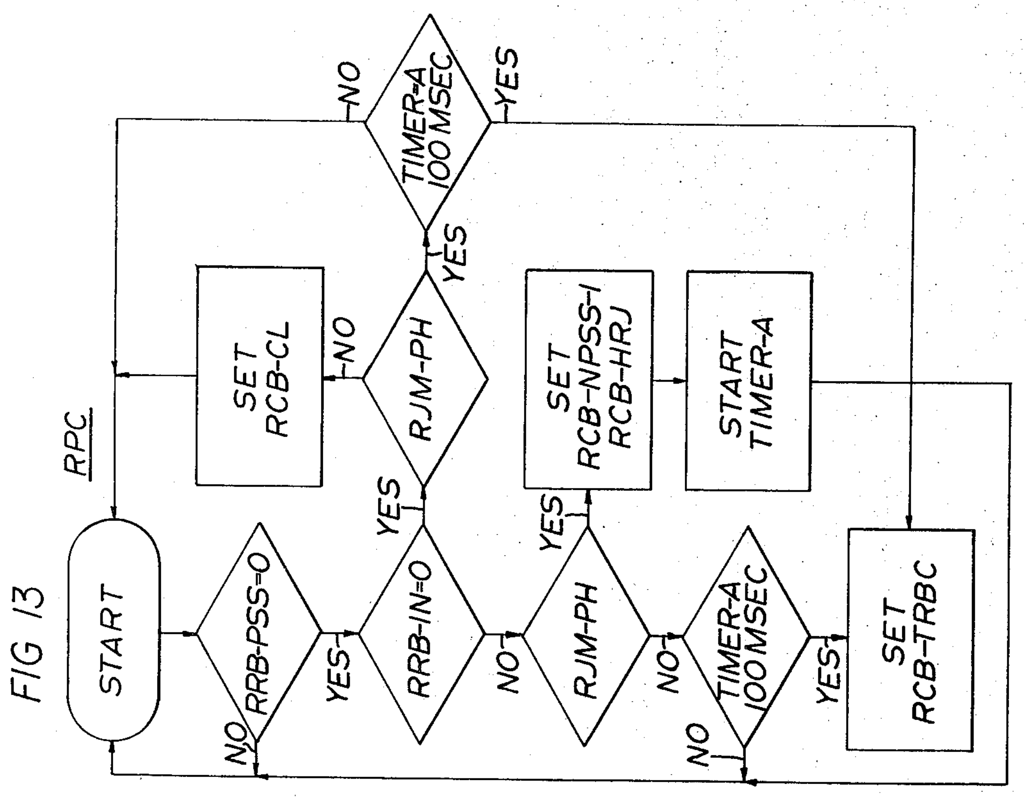
FIG. 13 is a flow chart illustrating the operation of the control transfer arrangement of the invention.

The operation of the control transfer arrangement of this invention may be summarized with reference to FIG. 13, which is a flow chart covering the operation of the pertinent circuits. When the logic for a register junctor is in state PSS=0, the logic circuitry in the process controller RPC (FIG. 11) makes a check as to whether the instruction digit also has a value IN=0 and whether the pulsing highway signal PH is true. Normally in the idle state there will be coincidence of the values PSS=0, IN=0 and PH false. The flow chart shows that this condition causes the carry buffer latch CL to be set during sub-time slot Y1, this being accomplished from the output of gate 20 (FIG. 11).

When a call is originated, after the originating marker 160 has sent a message to the data processor DPU, then the originating marker and the data processor proceed to operate simultaneously. The originating marker completes the temporary connection to the register junctor such as junctor RRJ-0 (FIG. 3) to operate the pulsing relay A which in turn, via the multiplex circuit, produces a signal on lead RJM-PH. The data processor DPU after making a translation to identify the register junctor supplies an instruction IN=1 into the register junctor memory position A of row 1 and at the same time IN=0 becomes not true. Either of these two conditions (PH true or IN=0 not true) may occur first. After one occurs, the logic allows 100 milliseconds for the other condition to occur. This is accomplished via TIMER A, which comprises positions K and L of row 1 in the memory along with corresponding common logic circuits. Normally in the idle state PSS=0 the setting of the carry buffer latch CL causes this portion of the memory along with the rest of row 1 to be reset, so that in effect the timer remains at its starting condition. However, when either the condition PH true or the condition IN=0 not true occurs, the the output of gate 20 (FIG. 11) becomes false so that latch CL is not set and in effect the timer is started and advances one step every cycle. If after 10 cycles of 10 milliseconds each or a total of 100 milliseconds, both conditions have still not been satisfied, a signal is developed at the output of either gate 25 or gate 26 which is applied through gates 27 and 28 to set the trouble latch TRBC.

Normally, both of the conditions (PH true and IN=0 not true) will occur well before the 100 millisecond time-out interval so that the output of gate 10 becomes true to set the carry buffer latches HRJ and NPSS-1. The output of latch HRJ via the multiplex circuits operates the hold relay 10H in the register junctor (FIG. 3) to provide the sustaining hold, allowing the marker 160 to drop out for processing of other calls. During sub-time slot Y9 with NPSS=0 not true, the output of gate 53 enables gate 43 to gate the signal from latch NPSS-1 to write the new sequence state PSS=1 into memory.

During the remainder of call processing the output of gate 16 is true every cycle during sub-time slot Y1 when the sequence state is not equal to PSS=0, PSS=13, PSS=14 or PSS=15 to set latch HRJ and thereby hold the register junctor.

After completion of call processing, the sequence state becomes PSS=13 and when the data processing unit returns an instruction of IN=12 or IN=13, the output of gate 22 becomes true to set the carry buffer latch CL and to cause all of the memory of the register junctor being processed to be cleared except for the processing sequence state digit. At the same time with sequence equal to PSS=13, the output of gate 16 becomes false so that the latch HRJ is not set and therefore the hold relay in the register junctor is released. In a subsequent cycle, the output of gate 50 (FIG. 12) becomes true to reset the sequence state digit in memory.

We claim:

1. In a communication system including a switching network having first and second groups of terminals, marker means for applying temporary hold signals to establish temporary connections between terminals of said first group and terminals of said second group and for transmitting information signals identifying said temporary connections, and data processing means for receiving said information signals and developing instruction signals in response thereto, a plurality of junctor means connected to said second group of terminals, each of said junctor means including holding means for responding to a temporary hold signal from said marker means to maintain a connection thereto through said switching network and further including signalling means responsive to establishment of a connection thereto, and transfer control means including logic circuit means for responding to instruction signals from said data processing means and to signals from said signalling means of said junctor means to develop sustaining hold signals, and means for applying said sustaining hold signals to said junctor means to sustain connections thereto and permit release of said temporary hold signals from said marker means.

2. In a system as defined in claim 1, a register subsystem including said junctors and further including memory means, writing means for writing signals into said memory means including signals from said signalling means of said junctor means, and reading means for reading out stored signals from said memory means to said logic circuit means.

3. In a system as defined in claim 2, said writing means being additionally operative for writing said instruction signals from said data processing means into said memory means, and said reading means being operative for reading out stored instruction signals from said memory means to said logic circuit means.

4. In a system as defined in claim 1, multiplex means for transmitting signals from said signalling means of said junctor means to said logic circuit means and for transmitting said sustaining hold signals from said logic circuit means to said junctor means.

5. In a system as defined in claim 4, said multiplex means being additionally operative for transmitting said instruction signals from said data processing means to said logic circuit means.

6. In a system as defined in claim 4, a register subsystem including said junctors and further including memory means, writing means operable in conjunction with said multiplex means for writing signals into said memory means including signals from said signalling means of said junctor means, and reading means operable in conjunction with said multiplex means for reading out stored signals from said memory means to said logic circuit means.

7. In a system as defined in claim 6, said writing means being additionally operative in conjunction with said multiplex means for writing signals from said data processing means into said memory means, and said reading means being operative in conjunction with said multiplex means for reading out stored instruction signals from said memory means to said logic circuit means.

8. In a system as defined in claim 1, said logic circuit means comprising AND gate means having inputs responsive to said signals from said signalling means of said junctor means and instruction signals from said data processing means and operative to develop and output signal only upon coincidence of said signals.

9. In a system as defined in claim 8, a carry buffer latch circuit responsive to said output signal from said AND gate means for developing said sustaining hold signals.

10. In a system as defined in claim 8, multiplex means for transmitting signals from said signalling means of said junctor means and instruction signals from said data processing means to said logic circuit means and sustaining hold signals from said logic circuit means to said junctor means, timing generator means associated with said multiplex means and operative to develop signals assigning a particular time slot to each of said junctor means and assigning a certain sub-time slot of each junctor means time slot for processing of signals from said signalling means of said junctor means and instruction signals from said data processing means, said AND gate means having an input responsive to said certain sub-time slot signal and being operative to develop an output signal only upon application of said certain sub-time slot signal thereto.

11. In a system as defined in claim 10, process sequence state control means for controlling the processing of signals through said switching network and operative to develop a certain process state signal for processing of signals from said signalling means of said junctor means and said instruction signals from said data processing means, said AND gate means having an additional input responsive to said certain process state signal and being operative to develop an output signal only upon application of said certain process state signal thereto.

12. In a system as defined in claim 11, a register subsystem including said junctors and further including memory means, writing means operable in conjunction with said multiplex means for writing signals into said memory means including signals, instruction signals from said data processing means and process state signals from said process sequence state control means, and reading means operable in conjunction with said multiplex means for reading out stored signals from said memory means to said logic circuit means.

13. In a system as defined in claim 1, timer means arranged to develop an output signal after a certain elapsed time after initiating operation thereof, means for initiating operation of said timer means in response to only one and not both of first and second signals, said first signal being a signal from said signalling means of a certain junctor means and said second signal being an instruction signal from said data processing means corresponding to said certain junctor means, means for resetting said timer means in response to coincidence of neither or both of said first and second signals, and trouble indicating means responsive to an output signal from said timer means.

14. In a system as defined in claim 1, including a plurality of line circuits connected to said first group of terminals, each one of said connections including a transmission path operative for transmission of dial pulses from a line circuit to a junctor means and the signalling means thereof.

15. In a system as defined in claim 14, said signalling means including bistable means shifted from a first state to a second state in response to completion of a transmission path from a line circuit to the associated junctor means and shifted from said first state to said second state by momentary dial pulse interruptions of said path, said logic circuit means being responsive only to signals generated by said bistable means in said second state thereof.

* * * * *